United States Patent
Purcell et al.

(10) Patent No.: US 6,246,666 B1
(45) Date of Patent: Jun. 12, 2001

(54) METHOD AND APPARATUS FOR CONTROLLING AN INPUT/OUTPUT SUBSYSTEM IN A FAILED NETWORK SERVER

(75) Inventors: Brian T. Purcell, Tomball; Sompong P. Olarig, Cypress, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/058,043

(22) Filed: Apr. 9, 1998

(51) Int. Cl.[7] .................................................. H04J 1/16
(52) U.S. Cl. ................................ 370/221; 709/221; 710/8
(58) Field of Search .......................... 370/216, 217–220, 370/242, 245, 419, 463, 221; 709/200, 212, 217, 219, 220, 221, 223, 224, 253; 710/1, 36, 62, 126, 129, 8, 10

(56) References Cited

U.S. PATENT DOCUMENTS

| | | | |
|---|---|---|---|
| 5,513,314 | * 4/1996 | Kandasamy et al. | 714/6 |
| 5,812,751 | * 9/1998 | Ekrot et al. | 714/4 |
| 5,852,724 | * 12/1998 | Glenn, II et al. | 709/239 |
| 6,065,085 | * 5/2000 | Odenwald, Jr. et al. | 710/129 |

OTHER PUBLICATIONS

Mendel, Brett; "Server I/O all set to flow"; *Lantimes*, Oct. 27, 1997, vol. 14, Issue 22; cover page and p. 31.
Briggs, Chris; "Smarter and Faster I/O for Servers"; CORE: Operating Systems; *Byte*, May 1, 1996, vol. 2, No. 5.
Thompson, Tom; "I2O Beats I/O Bottlenecks"; *Byte*, Aug. 1997, pp. 85, 86 and 3 additional pages.
I2O Introduction; Technology Backgrounder; Aug. 13, 1997; http://www.i2osig.org/Architecture/TechBack.html.
i960®RP I/O Processor—the I2O SIG site; http://134.134.214.1/design/iio/i2osig.html; Feb. 6, 1998.
"Welcome to the I2O SIG®Web Site!"; http://www.i2osig.org; Feb. 6, 1998.
"About I2O Technology"; http://www.i2osig.org/Architecture; Feb. 6, 1998.
"Technology Backgrounder"; http://www.i2osig.org/Architecture;TechBack.html; Feb. 6, 1998; 6 pages.
"Questions and Answers"; http://www.i2osig.org/Architecture/QandA.html; Feb. 6, 1998; 4 pages.
"I2O® Specifications For Non–Members"; http://www.i2osig.org/Architecture/GetSpec.html; Feb. 6, 1998.
Amdahl, Carlton G.; "I2O Future Directions"; http://www.i2osig.org; Jun. 1996; 12 pages.

(List continued on next page.)

*Primary Examiner*—David R. Vincent
(74) *Attorney, Agent, or Firm*—Fletcher, Yoder & Van Someren

(57) ABSTRACT

A method and apparatus for performing failover recovery in a network server. A first network server, operating within a communication network, is initialized to operate in a failover recovery mode. The network server includes a host computing system for controlling operation of the server and an Input/Output subsystem for controlling operation of peripheral devices associated with the first server. A communication link effectuates communication between the first server and a second network server. A heartbeat generator, located within the first server, generates a periodic heartbeat signal when the host computing system of the first server is functioning normally. A heartbeat timer, located within the Input/Output subsystem of the first server, detects an absence of the heartbeat signal by counting elapsed time between successive heartbeat signals. When the heartbeat timer times-out, indicating the absence of a heartbeat signal which would have reset the heartbeat timer, a Failover ISM, located within the Input/Output subsystem of the first server is interrupted. In response to the interrupt, the Failover ISM notifies the second server, via the communication link, of the absence of the heartbeat signal and the second server takes over control of peripheral devices located within the first server via the communication link.

18 Claims, 3 Drawing Sheets

OTHER PUBLICATIONS

Goble, Scott, et al.; "Intelligent I/O Architecture"; http://www.i2osig.org; Jun. 1996; 22 pages.

"Press Releases and Clips"; http://www.i2osig.org/Press; Feb. 6, 1998; 4 pages.

Listing of Press Releases; http://altavista.digital.com/cgi–bin/quer . . . =21%2FMar%2F86&d1=&search.x=46&search.y=6; Feb. 6, 1998; 2 pages.

Crothers, Brooke; "Intel server chip gets big backing", Oct. 7, 1997; http://www.news.com/News/Item/0,4,14962,00.html; Feb. 6, 1998.

"HP Demonstrates Commitment to I2O Standard With New I2O Disk–array Controller"; *Hewlett Packard*; Press Release, Atlanta, Oct. 8, 1997; http://hpcc920.external.hp.com/pressrel/oct97/08oct97b.html; Feb. 6, 1998; 2 pages.

"I2O: Disaster in the making for the freeware community"; http://22.kenandted.com/i2o/disaster.html; Feb. 6, 1998; 2 pages.

\* cited by examiner

METHOD AND APPARATUS FOR CONTROLLING AN INPUT/OUTPUT SUBSYSTEM IN A FAILED NETWORK SERVER

BACKGROUND OF THE INVENTION

Computer systems have achieved wide usage in modern society. During operation, a computer system processes and stores data at a speed and at a level of accuracy many times that which can be performed manually. Successive generations of computer systems have permitted ever-increasing amounts of data to be processed at ever-increasing rates.

Computer systems are sometimes operated as stand-alone devices or connected together by way of network connections, typically together with a network server, to form a computer network. When networked together, communication between the separate computer systems is possible. Files and other data, stored or generated at one computer system, can be transferred to another computer system.

A conventional computer system typically includes one or more Central Processing Units (CPUs) capable of executing algorithms forming applications and a computer main memory. Peripheral devices, both those embedded together with a CPU or constructed to be separate therefrom, also typically form portions of a conventional computer system. Computer peripheral devices include, for instance, video graphics adapters, Local Area Network (LAN) interfaces, Small Computer System Interface (SCSI) bus adapters, and mass storage devices, such as disk drive assemblies.

A computer system further typically includes computer buses which permit the communication of data between various portions of the computer system. For example, a host bus, a memory bus, at least one high-speed bus, a local peripheral expansion bus, and one or more additional peripheral buses form portions of a typical computer system.

A peripheral bus is formed, for instance, of a SCSI bus, an Extension to Industry Standard Architecture (EISA) bus, an Industry Standard Architecture (ISA) bus, or a Peripheral Component Interface (PCI) bus. The peripheral bus forms a communication path to and from a peripheral device connected thereto. The computer system CPU, or a plurality of CPUs in a multi-processor system, communicates with a computer peripheral device by way of a computer bus, such as one or more of the computer buses noted above.

A computer peripheral, depending upon its data transfer speed requirements, is connected to an appropriate peripheral bus, typically by way of a bus bridge that detects required actions, arbitrates, and translates both data and addresses between the various buses.

A computer peripheral device forming a portion of a single computer system might well be supplied by a manufacturer other than the manufacturer of the computer CPU. If the computer system contains more than one peripheral device, the peripheral devices might also be supplied by different manufacturers. Furthermore, the computer system may be operable pursuant to any of several different operating systems. The various combinations of computer peripheral devices and computer operating systems of which a computer system might be formed quickly becomes quite large.

Software drivers are typically required for each computer peripheral device to effectuate its operation. A software driver must be specifically tailored to operate in conjunction with the particular operating system operating on the computer. A multiplicity of software drivers might have to be created for a single computer peripheral to ensure that a computer peripheral device is operable together with any of the different operating systems.

The complexity resulting from such a requirement has led, at least in part, to the development of an Intelligent Input/Output ($I_2O$) standard specification. The $I_2O$ standard specification sets forth, inter alia, standards for an I/O device driver architecture that is independent of both the specific peripheral device being controlled and the operating system of the computer system to which the device driver is to be installed.

In the $I_2O$ standard specification, the portion of the driver that is responsible for managing the peripheral device is logically separated from the specific implementation details of the operating system with which is to be installed. Because of this, the part of the driver that manages the peripheral device is portable across different computers and operating systems. The $I_2O$ standard specification also generalizes the nature of communication between the host computer system and peripheral hardware; thus, providing processor and bus technology independence.

The "split driver" model of the $I_2O$ specification, described above, allows peripheral devices to communicate directly between each other using what is referred to as Peer-to-Peer communication. Peer-to-Peer communication allows data to be transferred between two or more devices, with little or no involvement by the host operating system. To effectuate Peer-to-Peer communication, a Peer-to-Peer Operating System Module (Peer-to-Peer OSM) performs a discovery operation to create a Peer Availability Matrix during setup and initialization of the computer system. The Peer Availability Matrix contains information listing IOPs and peer objects which are available for communicating using Peer-to-Peer communication. During the discovery operation, the Peer-to-Peer OSM instructs each Integrated Real Time Operating Systems (IRTOS) controlling respective IOPs to create a list of all peer objects operating within the respective IOPs. The IRTOS of each IOP creates a list and forwards the list to the Peer-to-Peer OSM.

Network servers are often designed to include a host computer system and an Input/Output subsystem (I/O subsystem) wherein the I/O subsystem further includes various peripheral devices. A network server often operates in a clustered computing environment containing various other network servers and computing devices. When a network server fails, its I/O subsystem is unavailable to other network servers and computing devices in the clustered computing environment. The I/O subsystem, including the peripheral devices, are unavailable even when the Input/Output subsystem and peripheral devices are capable of functioning normally.

It would be advantageous, therefore, to devise a method and apparatus for performing a failover recovery which allows a normally functioning Input/Output subsystem, including associated peripheral devices, to remain available to other computing devices in a clustered computing environment even though a failure has occurred in the network server. It would further be advantageous if the method and apparatus utilized Peer-to-Peer communication, available on 120 compliant devices, to effectuate the failover recovery.

SUMMARY OF THE INVENTION

The present invention comprises a method and apparatus for performing failover recovery in a network server. A first network server, operating within a communication network, is initialized to operate in a failover recovery mode. The first network server includes a host computing system for controlling operation of the network server and an Input/Output subsystem for controlling operation of peripheral devices associated with the first network server.

A communication link effectuates communication between the first network server and a second network server. The second network server also operates within the communication network.

A heartbeat generator, located within the host computing system of the first network server, generates a periodic heartbeat signal when the host computing system of the first network server is functioning normally. A heartbeat timer, located within the Input/Output subsystem of the first network server, is used to detect an absence of the heartbeat signal in the first network server by counting elapsed time between successive heartbeat signals. When the heartbeat timer times-out, indicating the absence of a heartbeat signal which would have reset the heartbeat timer, a Failover ISM, located within the Input/Output subsystem of the first network server is interrupted.

In response to the interrupt, the Failover ISM notifies the second network server, via the communication link, of the absence of the heartbeat signal in the first network server. The second network server takes over control of peripheral devices located within the first network server via the communication link in response to notification of the absence of the heartbeat signal in the first network server.

BRIEF DESCRIPTION OF THE DRAWINGS

A more complete understanding of the present invention may be had by reference to the following Detailed Description and appended claims, when taken in conjunction with the accompanying Drawings wherein:

DETAILED DESCRIPTION

The present invention performs in accordance with the Intelligent Input/Output ($I_2O$) architecture specification. In the following description of the present invention, certain aspects of the $I_2O$ specification are discussed. For instance, the hardware and software independent architecture centered around a split driver model and Peer-to-Peer communication specified in the $I_2O$ specification are used and described in connection with the present invention. It is understood that these and other aspects are well known in the industry and that a further, and more detailed, description of the operation of $I_2O$ technology is available in the Intelligent Input/Output ($I_2O$) specification. That specification, to the fullest extent possible, is hereby incorporated herein by this reference thereto.

Figure 1:
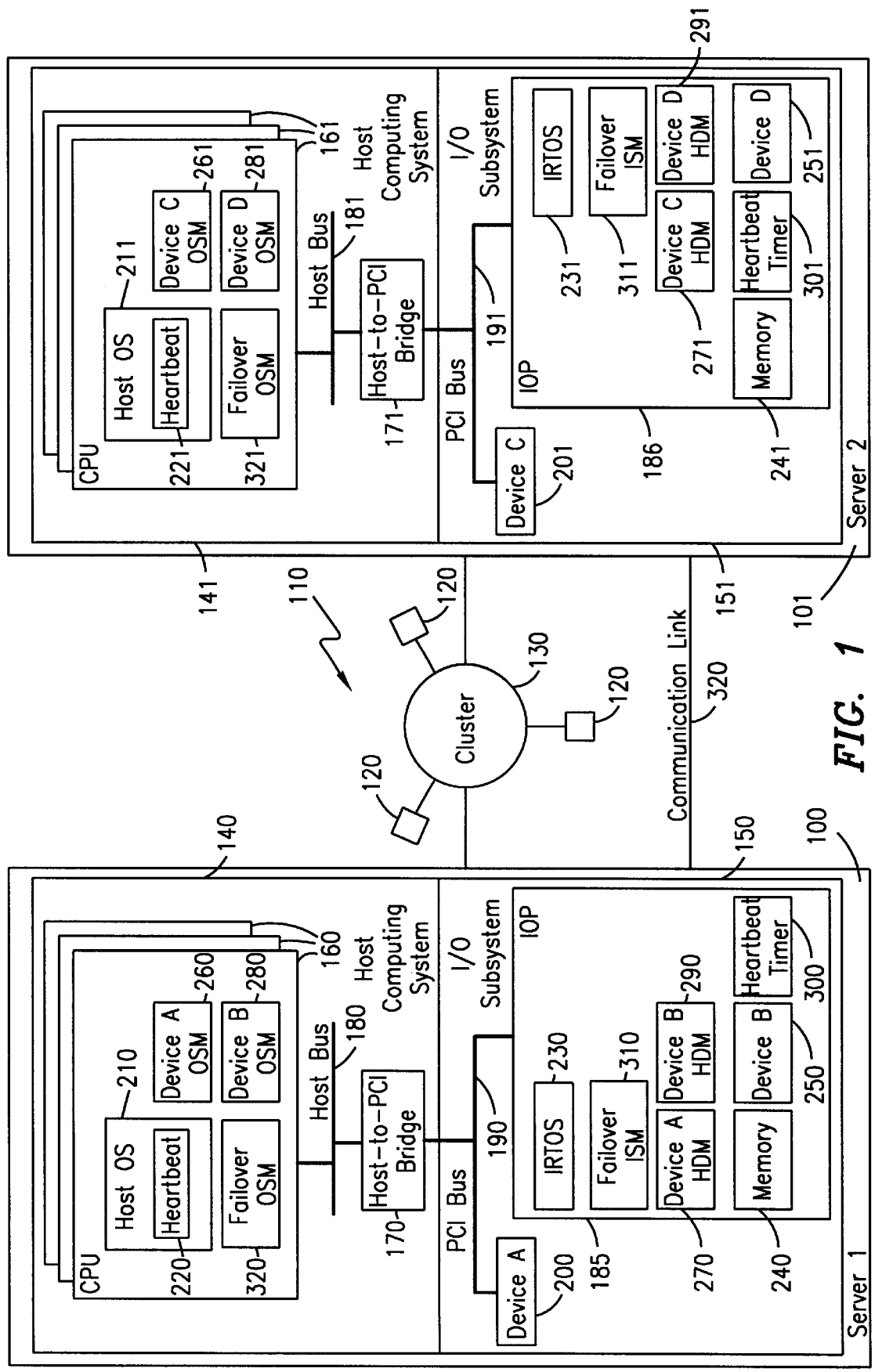
FIG. 1 is a functional block diagram of a first and a second network server, operating in a clustered computing environment, for performing failover recovery consistent with a preferred embodiment of the present invention.

Referring now to FIG. 1, there is illustrated a functional block diagram of a first and a second network server, operating in a clustered computing environment, for performing failover recovery. A first network server 100 and a second network server 101 operate within a clustered computing environment, shown generally at 110. The clustered computing environment 110 comprises the first network server 100, the second network server 101 and various other network servers and/or computing devices 120 which communicate with one another across at least one communication network 130.

The first network server 100 comprises a host computing system 140 and an Input/Output subsystem (I/O subsystem) 150. The host computing system 140 comprises one or more host Central Processing Units (CPUs) 160 communicating with a Host-to-PCI bridge 170, and a memory (not shown) across a host bus 180. The I/O subsystem 150 comprises at least one Input/Output Processor (IOP) 185 which communicates with the Host-to-PCI bridge 170 across a Peripheral Component Interface (PCI) bus 190. The I/O subsystem 150 may also include one or more stand-alone peripheral devices 200 which communicate with the IOP 185 and the Host-to-PCI bridge 170 across the PCI bus 190.

The second network server 101 comprises a host computing system 141 and an I/O subsystem 151. The host computing system 141 comprises one or more host CPUs 161 communicating with a Host-to-PCI bridge 171, and a memory (not shown) across a host bus 181. The I/O subsystem 151 comprises at least one IOP 186 which communicates with the Host-to-PCI bridge 171 across a PCI bus 191. The I/O subsystem 151 may also include one or more stand-alone peripheral devices 201 which communicate with the IOP 186 and the Host-to-PCI bridge 171 across the PCI bus 191.

A host Operating System 210 generally controls operation of the first network server 100 and, in particular, controls operation of the host computing system 140. The host Operating System 210 also controls operation of a heartbeat generator 220 which generates a repetitive heartbeat signal when the host computing system 140 is functioning normally. Similarly, a host Operating System 211 generally controls operation of the second network server 101 and, in particular, controls operation of the host computing system 141. The host Operating System 201 also controls operation of a heartbeat generator 221 which generates a repetitive heartbeat signal when the host computing system 141 is functioning normally.

An Integrated Real Time Operating System (IRTOS) 230 controls operation of IOP 185 located in the first server 100 while an IRTOS 231 controls operation of IOP 186 located in the second server 101. IOP 185 includes a memory 240, one or more peripheral devices 250 and a heartbeat timer 300. The heartbeat timer 300 is used by the I/O subsystem 150 to count time intervals between heartbeat signals generated by the heartbeat generator 220. A Failover Intermediate Service Module (Failover ISM) 310 effectuates the failover recovery process (described in FIG. 3) whenever the first network server 100 or the second network server 101 fail. Failover ISM 310 operates in conjunction with a Failover Operating System specific Module (Failover OSM) 320 which operates on the host CPUs 160. The device 250, as with the device 200, can be any type of peripheral system device such as, but not limited to, a Local Area Network (LAN) controller, a Small Computer Systems Interface controller (SCSI) or a Redundant Array of Independent Drives controller (RAID).

Devices 200 and 250 are controlled under the direction of an associated device driver. In accordance with the split driver model of the $I_2O$ standard, each device driver is comprised of an Operating System specific Module (OSM) which operates on the host CPUs 160 and a Hardware Device Module (HDM) which operates on the IOP 185. The device driver for the device 200 is comprised of a an OSM 260 operating on the host CPUs 160 and an HDM 270 operating on the IOP 185. Likewise, the device driver for the device 250 is comprised of an OSM 280 operating on the host CPUs 160 and an HDM 290 operating on the IOP 185.

The first network server 100 and the second network server 101 communicate with each other across one or more communication links including communication link 320. The communication link 320 can utilize any communication medium and protocol including a Fibre Channel and a Server Net Fail-over link both of which are commonly known in the industry. I/O subsystem 150 and I/O subsystem 151 are capable of Peer-to-Peer communication across the communication link 320 in a manner commonly known in the industry.

IOP 186 includes a memory 241, one or more peripheral devices 251 and a heartbeat timer 301. The heartbeat timer 301 is used by the I/O subsystem 151 to count time intervals between heartbeat signals generated by the heartbeat generator 221. A Failover ISM 311 effectuates the failover recovery process (described in FIG. 3) whenever the first network server 100 or the second network server 101 fail. Failover ISM 311 operates in conjunction with a Failover OSM 321 which operates on the host CPUs. 160. The device 251, as with the device 201, can be any type of peripheral system device such as, but not limited to, a Local Area Network (LAN) controller, a Small Computer Systems Interface controller (SCSI) or a Redundant Array of Independent Drives controller (RAID).

Device 201 is controlled under the direction of HDM 271 which operates on the IOP 186 and OSM 260 operating on the host CPUs 160. Similarly, device 251 is controlled under the direction of HDM 291 and OSM 281.

Figure 2:
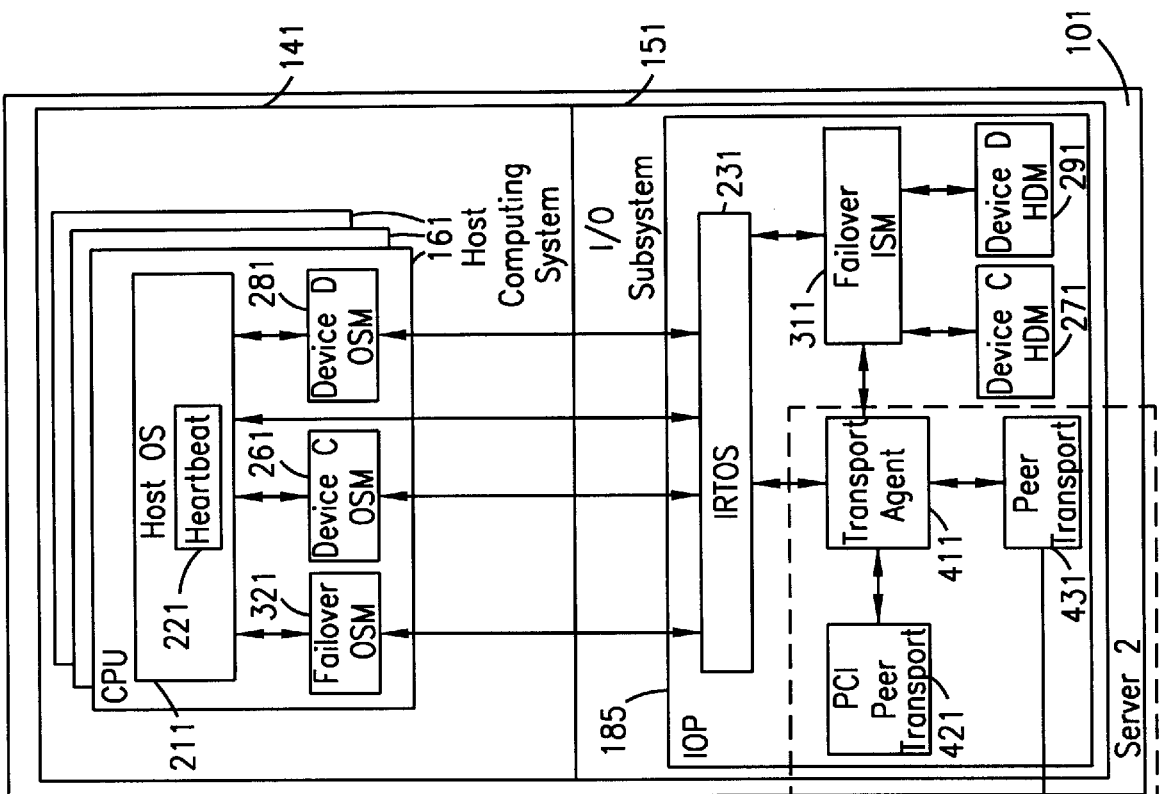
FIG. 2 is a functional block diagram of a software architecture for the first and the second network server described in FIG. 1.
Figure 2:
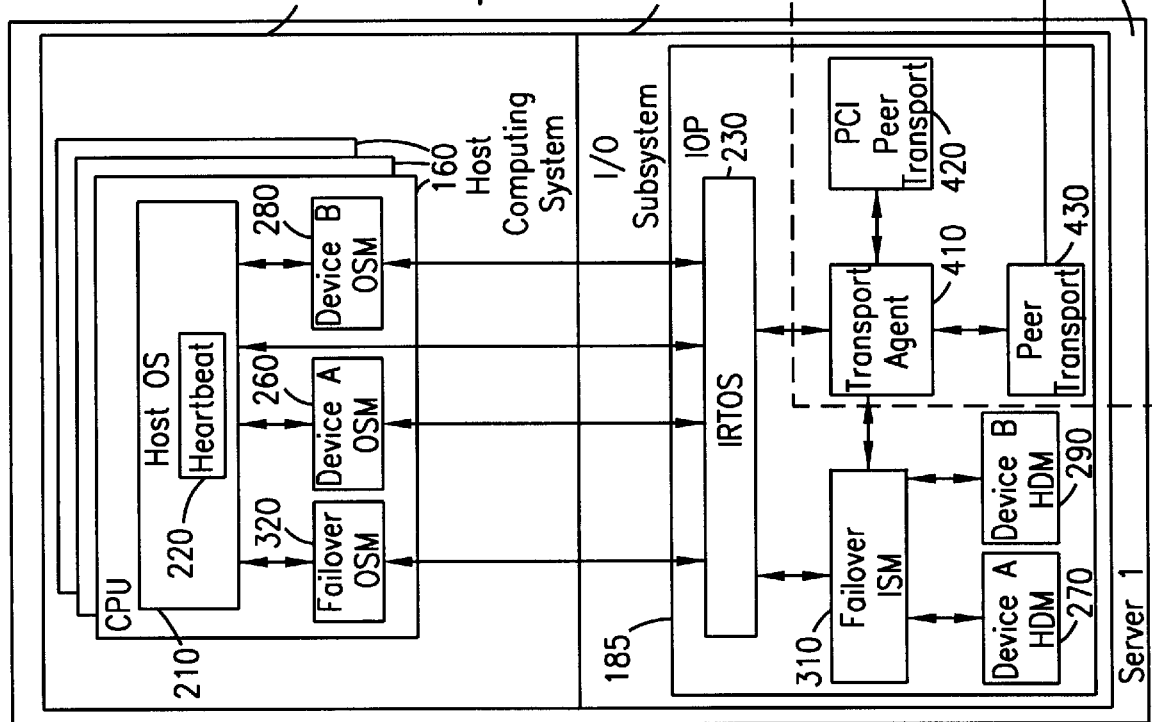

Referring additionally now to FIG. 2, there is illustrated a functional block diagram of a software architecture for the first and the second network server described in FIG. 1. In addition to the components and functionality described in FIG. 1, each of the IOPs 160 include a data transport layer 400. A transport agent 410 provides an interface between the data transport layer 400 of the IOP 185 and both the IRTOS 230 and the Failover ISM 310 Likewise, a transport agent 410 provides an interface between the data transport layer 400 of the IOP 186 and both the IRTOS 231 and the Failover ISM 311.

The transport layer 400 of IOP 185 and IOP 186 include a peer transport for each communication media and protocol supported by the particular IOP. The peer transport effectuates a communication interface between the transport layer 400 of the particular IOP and the communication media. In FIG. 2, a PCI peer transport 420 supports communication by IOP 185 across the PCI bus 190 while a peer transport 430 supports communication by IOP 185 across the communication link 320. Likewise, a PCI peer transport 421 supports communication by IOP 186 across the PCI bus 191 while a peer transport 431 supports communication by the IOP 186 across the communication link 320.

Figure 3:
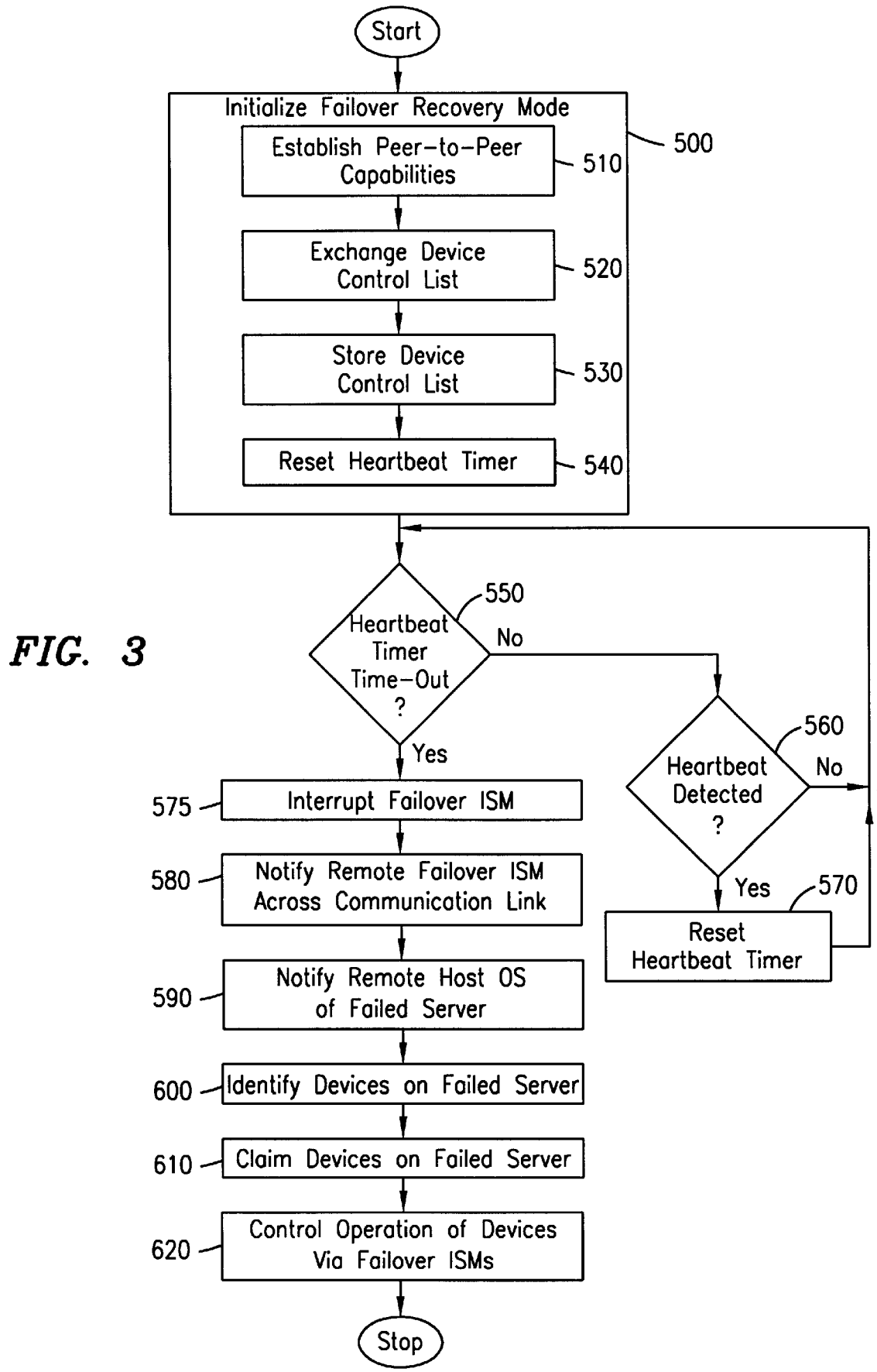
FIG. 3 is a flow diagram of a method for performing failover recovery consistent with the preferred embodiment of the present invention.

Referring additionally now to FIG. 3, there is illustrated a method for performing failover recovery consistent with the preferred embodiment of the present invention. During an initialization process, the first network server 100 and the second network server 101 initialize IOP 185 and IOP 186, respectively, to operate in a failover recovery mode (step 500). IOP 185 and IOP 186 establish Peer-to-Peer communication between each other (step 510) and exchange device control lists (step 520). Among other information, the device control lists contain a list of the peripheral devices with which the particular IOP can communicate and/or control. The information about the IOPs contained in the device control lists allow a failover server, which is performing a failover recovery on a failed server, to claim and control the I/O subsystem of the failed server. Thus, IOP 185 receives and stores (step 530) a control list from IOP 186 which identifies devices with which IOP 186 can communicate and/or control. Similarly, IOP 186 receives and stores (step 530) a control list from IOP 185 which identifies devices with which IOP 185 can communicate and/or control. Each network server also resets its respective heartbeat timer (step 540) during the initialization process. Thus, host Operating System 220 in network server 100 resets heartbeat timer 300 and host Operating System 221 in network server 101 resets heartbeat timer 301.

During normal operation of the first network server 100, the heartbeat generator 220 periodically generates a heartbeat signal which resets the heartbeat timer 300. In the event of a host Operating System 210 or hardware failure, the heartbeat signal is not delivered to the IOP 185 and the heartbeat timer 300 "times-out." Thus, a determination is made as to whether the heartbeat timer 300 has timed-out (step 550). If the heartbeat timer 300 has not timed-out, a determination is made as to whether a heartbeat signal was detected (step 560). If a heartbeat signal was detected, the heartbeat timer 300 is reset (step 570) and monitoring for a heartbeat timer 300 time-out continues at step 550. If a heartbeat signal was not detected in step 560, monitoring for a heartbeat timer 300 time-out continues at step 550.

If, in step 550, a determination is made that the heartbeat timer 300 has timed-out, the Failover ISM 310 is interrupted (step 575) and notification of the failure is sent to the remote Failover ISM 311 in network server 101 across the communication link 320 (step 580). Upon notification that a failure has occurred in the first network server 100, the Failover ISM 311 notifies the host Operating System 211 of the failure condition (step 590) and the host Operating System 211 identifies devices on the failed network server (i.e. network server 100) which are available for control by the second network server 101 (step 600). The host Operating System 211 claims the devices on the I/O subsystem 150 (step 610). By claiming the devices on the I/O subsystem 150, the second network server 101 is reconfigured to control the devices and notification is provided to the clustered computing environment 110 that the devices which were formerly under the control of the first network server 100 are now under the control of the second network server 101. Operation of devices on the I/O subsystem 150 of the first network server 100 are controlled by the second network server 101 (step 620) using Peer-to-Peer communication via Failover ISM 231 and Failover ISM 230.

Failover recovery in response to failures in the second network server 101 occurs in a similar fashion. During normal operation, the heartbeat generator 221 periodically generates a heartbeat signal which resets the heartbeat timer 301. In the event of a host Operating System 211 or hardware failure, the heartbeat signal is not delivered to the IOP 186 and the heartbeat timer 301 "times-out." Thus, a determination is made as to whether the heartbeat timer 301 has timed-out (step 550). If the heartbeat timer 301 has not timed-out, a determination is made as to whether a heartbeat signal was detected (step 560). If a heartbeat signal was detected, the heartbeat timer 301 is reset (step 570) and monitoring for a heartbeat timer 301 time-out continues at step 550. If a heartbeat signal was not detected in step 560, monitoring for a heartbeat timer 301 time-out continues at step 550.

If, in step 550, a determination is made that the heartbeat timer 301 has timed-out, the Failover ISM 311 is interrupted (step 575) and notification of the failure is sent to the remote Failover ISM 310 in network server 100 across the communication link 320 (step 580). Upon notification that a failure has occurred in the second network server 101, the Failover ISM 310 notifies the host Operating System 210 of the failure condition (step 590) and the host Operating System 210 identifies devices on the failed network server (i.e. network server 101) which are available for control by the first network server 100 (step 600). The host Operating System 210 claims the devices on the I/O subsystem 151 (step 610). By claiming the devices on the I/O subsystem 151, the first network server 100 is reconfigured to control the devices and notification is provided to the clustered computing environment 110 that the devices which were formerly under the control of the second network server 101 are now under the control of the first network server 100. Operation of devices on the I/O subsystem 151 of the network server are controlled by the first network server 100 (step 620) using Peer-to-Peer communication via Failover ISM 230 and Failover ISM 231.

Utilizing the method and apparatus of the present invention, an I/O subsystem of a network server, including associated peripheral devices, remains available even when a host computing system of the network server fails. Other computing devices within the clustered computing environment are able to communicate with the I/O subsystem and associated peripheral devices and a failover network server is able to control the I/O subsystem and associated peripheral devices using Peer-to-Peer communication.

Although the preferred embodiment of the apparatus and method of the present invention has been illustrated in the accompanying Drawings and described in the foregoing Detailed Description, it is understood that the invention is not limited to the embodiments disclosed, but is capable of numerous rearrangements, modifications and substitutions without departing from the spirit of the invention as set forth and defined by the following claims.

What is claimed is:

1. A computer system comprising:
    a first network server operating within a communication network, the first network server including a host computer system for controlling the operation of the server and an Input/Output subsystem for controlling operation of peripheral devices associated with the Input/Output subsystem;
    a communication link for effectuating communication between the first network server and a second network server, the second network server also operating within the communication network;
    a heartbeat generator located within the host computing system, the heartbeat generator for generating a repetitive heartbeat signal when the host computing system is functioning normally;
    a heartbeat timer located within the Input/Output subsystem, the heartbeat timer for counting elapsed time between successive heartbeat signals; and
    a Failover Intermediate Service Module (ISM) located within the Input/Output subsystem for detecting when the heartbeat timer times-out, the Failover ISM further for notifying the second network server via the communication link when the heartbeat timer times-out, wherein the Failover ISM controls operation of the peripheral devices associated with the Input/Output subsystem in response to control commands received from the second network server via the communication link.

2. The computer system as recited in claim 1, wherein the Input/Output subsystem further comprises a peer transport for effectuating communication between the first network server and the second network server via the communication link.

3. The computer system as recited in claim 2, wherein the Input/Output subsystem further comprises a transport agent for effectuating communication between the Failover ISM and the peer transport.

4. The computer system as recited in claim 1, wherein the communication link is effectuated using a Fibre Channel.

5. The computer system as recited in claim 1, wherein the communication link is effectuated using a ServerNet link.

6. The computer system as recited in claim 1, wherein communication between the first network server and the second network server via the communication link is effectuated using Peer-to-Peer communication.

7. The computer system as recited in claim 1, wherein the Failover ISM receives a Failover notification from the second network server and further wherein the Failover ISM forwards the failover notification to the host computing system.

8. The computer system as recited in claim 7, wherein the first server controls peripheral devices associated with an Input/Output subsystem within the second network server in response to the failover notification from the second network server and, further wherein, the second network server controls operation of the peripheral devices associated with the Input/Output subsystem of the first network server in response to the failover notification from the first network server.

9. A method for performing failover recovery in a network server comprising the steps of:
    initiating at least a first and a second network server to operate in a failover recovery mode;
    detecting an absence of a heartbeat signal in the first network server;
    notifying the second network server of the absence of the heartbeat signal in the first network server via a communication link between the first network server and the second network server; and
    controlling operation of peripheral devices located within the first network server by the second network server via the communication link in response to notification of the absence of the heartbeat signal in the first network server.

10. The method as recited in claim 9, wherein the step of initializing the first and the second network servers comprises the step of establishing Peer-to-Peer communication between the first network server and the second network server.

11. The method as recited in claim 10, wherein the step of initializing the first and second network servers further comprises the step of resetting a heartbeat timer located in the first network server.

12. The method as recited in claim 11, wherein the step of initializing the first and second network servers further comprises the step of furnishing the second network server with a list containing devices which are under the control of the first network server.

13. The method as recited in claim 11, wherein the step of detecting the absence of the heartbeat signal in the first network server comprises the steps of:

detecting the heartbeat signal;

resetting the heartbeat timer in response to the detection of the heartbeat signal; and detecting a timed-out condition after a certain period of time has elapsed since last resetting the heartbeat timer.

14. The method as recited in claim 10, wherein the step of notifying the second network server of the absence of the heartbeat signal in the first network server comprises the steps of:

notifying the second network server of the absence of the heartbeat signal via the communication link using Peer-to-Peer communication; and forwarding the notification received by the second network server to a host computing system located within the second network server.

15. The method as recited in claim 10, wherein the step of controlling operation of peripheral devices on the first network server by the second network server further comprises the steps of:

identifying the peripheral devices to be controlled by the second network server; and claiming the peripheral devices identified to be controlled by the second network server.

16. The method as recited in claim 15, wherein the step of claiming the peripheral devices comprises the steps of:

reconfiguring the second network server to recognize the existence of the peripheral devices located on the first network server; and notifying communication networks with which the first network server communicates that access to the peripheral devices is effectuated via the second network server.

17. A computer system, comprising:

a plurality of servers, each of the plurality of servers comprising:

a host computer system adapted to control operation of the server;

an input/output subsystem adapted to control operation of a peripheral device;

a communication link to the remaining plurality of servers; and a failover system to enable each of the remaining plurality of servers to operate the input/output subsystem via the communication link in the event of a failure of the host computer system.

18. The system as recited in claim 16, wherein the input/output subsystem utilizes the Intelligent Input/Output Standard for input/output device drivers.

\* \* \* \* \*